(12) United States Patent
Bleak et al.

(10) Patent No.: US 12,525,242 B2
(45) Date of Patent: Jan. 13, 2026

(54) TRANSCRIPTION PRESENTATION

(71) Applicant: Sorenson IP Holdings, LLC, Salt Lake City, UT (US)

(72) Inventors: Loren Bleak, Eagle Mountain, UT (US); Adam Montero, Sandy, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 184 days.

(21) Appl. No.: 17/524,150

(22) Filed: Nov. 11, 2021

(65) Prior Publication Data

US 2023/0141096 A1 May 11, 2023

(51) Int. Cl.
*G10L 15/26* (2006.01)
*G06F 40/166* (2020.01)
*H04M 3/42* (2006.01)

(52) U.S. Cl.
CPC ............ *G10L 15/26* (2013.01); *G06F 40/166* (2020.01); *H04M 3/42391* (2013.01); *H04M 2201/40* (2013.01)

(58) Field of Classification Search
USPC ...................................................... 704/1–504
See application file for complete search history.

(56) References Cited

U.S. PATENT DOCUMENTS

| | | | |
|---|---|---|---|
| 10,325,597 B1 | 6/2019 | Chevrier et al. | |
| 10,573,312 B1 * | 2/2020 | Thomson | G10L 15/22 |
| 10,971,153 B2 * | 4/2021 | Thomson | G10L 15/30 |
| 11,594,221 B2 * | 2/2023 | Thomson | G10L 15/187 |
| 11,848,000 B2 * | 12/2023 | Lewis | G10L 15/01 |
| 2001/0005825 A1 * | 6/2001 | Engelke | G10L 15/26 704/235 |
| 2004/0228325 A1 * | 11/2004 | Hepworth | H04M 3/42391 370/352 |
| 2007/0038943 A1 * | 2/2007 | FitzGerald | H04M 1/72436 715/752 |
| 2011/0004930 A1 * | 1/2011 | Ellis, III | H04L 63/0209 726/11 |
| 2011/0123003 A1 * | 5/2011 | Romriell | G06F 40/166 715/256 |

(Continued)

FOREIGN PATENT DOCUMENTS

CN 110244995 A 9/2019

OTHER PUBLICATIONS

Olwal Alex Olwal@ACM ORG et al: "Wearable Subtitles Augmenting Spoken Communication with Lightweight Eyewear for All-day Captioning", Proceedings of the 33rd Annual ACM Symposium on Use Interface Software and Technology, ACMPUB27, Oct. 20, 2020, pp. 1108-1120, New York, NY.

(Continued)

*Primary Examiner* — Marcus T Riley
(74) *Attorney, Agent, or Firm* — Maschoff Brennan

(57) ABSTRACT

A method of transcript presentation may include obtaining, at a device, transcript data that includes a transcription of audio data. The method may also include presenting, by a display of the device, the transcript data and obtaining, at the device, a revision to the transcript data. The method may further include obtaining an indication of a change to the presentation on the display of the device and in response to the indication of the change to the presentation, presenting, by the device, the revision.

20 Claims, 6 Drawing Sheets

(56) References Cited

U.S. PATENT DOCUMENTS

| | | | | |
|---|---|---|---|---|
| 2015/0058006 | A1* | 2/2015 | Proux | G10L 15/26 |
| | | | | 704/235 |
| 2016/0247503 | A1* | 8/2016 | Vanheuverswyn | G06F 40/166 |
| 2017/0187876 | A1* | 6/2017 | Hayes | H04N 7/147 |
| 2017/0206808 | A1* | 7/2017 | Engelke | H04M 3/42391 |
| 2018/0130483 | A1* | 5/2018 | Dimino, Jr. | H04N 21/43074 |
| 2018/0130484 | A1* | 5/2018 | Dimino, Jr. | H04N 21/234336 |
| 2020/0007671 | A1* | 1/2020 | Engelke | H04M 3/42391 |
| 2020/0090661 | A1* | 3/2020 | Ackerman | G06V 40/172 |
| 2020/0175987 | A1* | 6/2020 | Thomson | G10L 15/26 |
| 2020/0243094 | A1* | 7/2020 | Thomson | G10L 15/28 |
| 2020/0411007 | A1* | 12/2020 | Boehme | G10L 15/32 |
| 2021/0233530 | A1* | 7/2021 | Thomson | G10L 15/30 |
| 2022/0059075 | A1* | 2/2022 | Thomson | G10L 15/08 |
| 2022/0076681 | A1* | 3/2022 | Boekweg | G10L 15/26 |
| 2023/0141096 | A1* | 5/2023 | Bleak | G10L 15/26 |
| | | | | 704/270 |
| 2023/0386471 | A1* | 11/2023 | Thomson | G10L 21/0272 |

OTHER PUBLICATIONS

Machacek Dominik et al: "Presenting Simultaneous Translation in Limited Space", retrieved from the internet on Feb. 22, 2023, https://arxiv.org/abs/2009.09016.pdf.

International Search Report and Written Opinion as issued in connection with International Patent Application No. PCT/US2022/048877, dated Mar. 9, 2023.

\* cited by examiner

FIG. 2A

Audio: This | is a | This | new | cat
210 — 210a — 210b — 210c — 210d

220a — First Hypothesis:   This a
220b — Second Hypothesis:  This a blue
220c — Third Hypothesis:   This is a blue
220d — Fourth Hypothesis:  This is a blue cat
220e — Fifth Hypothesis:   This is a new cat

FIG. 2B

230a: This a
230b: This a blue
230c: This is a blue cat
230d: This is a new cat

FIG. 2C

TRANSCRIPTION PRESENTATION

FIELD

The embodiments discussed herein are related to transcription presentation.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method of transcript presentation may include obtaining, at a device, transcript data that includes a transcription of audio data. The method may also include presenting, by a display of the device, the transcript data and obtaining, at the device, a revision to the transcript data. The method may further include obtaining an indication of a change to the presentation on the display of the device and in response to the indication of the change to the presentation, presenting, by the device, the revision.

BRIEF DESCRIPTION OF THE DRAWINGS

Example embodiments will be described and explained with additional specificity and detail through the use of the accompanying drawings in which:

FIGS. 2a, 2b, and 2c illustrate an example of transcription presentation;

DESCRIPTION OF EMBODIMENTS

In some circumstances, a person may be presented with transcriptions of real-time audio. For example, during a phone call between the person and another person, the person may receive transcriptions of audio of the phone call. In these and other circumstances, the transcriptions may be presented in real-time or substantially real-time to help to maintain a close relationship between the transcriptions and the audio. As the transcriptions are presented, however, an initially presented transcription may include errors. In these and other circumstances, revisions to the transcriptions may be presented. However, when a revision to a transcription is presented, the revision may be disruptive to the person as the person reads the transcription. For example, the revision may draw the eye of the person away from the text of the transcription currently being read. Alternately or additionally, the revisions may result in shifting of text or text alignment causing a person to lose track of their current reading position when reading a transcription.

Some embodiments in this disclosure relate to systems and methods that may be configured to control presentation of transcriptions. For example, in some embodiments, revisions to presented transcriptions may be presented in a manner to reduce disruptions to a reader of the presented transcriptions.

In some embodiments to control presentation of transcriptions, revisions to a transcription may be not presented on a display of a device as soon as the revisions are available for presentation. Rather, revisions to a transcription may be presented on the display in response to an indication of a change to a presentation of the display. For example, an indication of a change to a presentation of a display may include a change to the presentation that results in the shifting of eyes of a person looking at the presentation. Because the change to the presentation of the display results in the shifting of eyes, presenting a revision in an overlapping time period may not result in an additional shifting of the eyes when the revisions is presented thereby reducing any disruption caused by presenting the revision.

Figure 1:
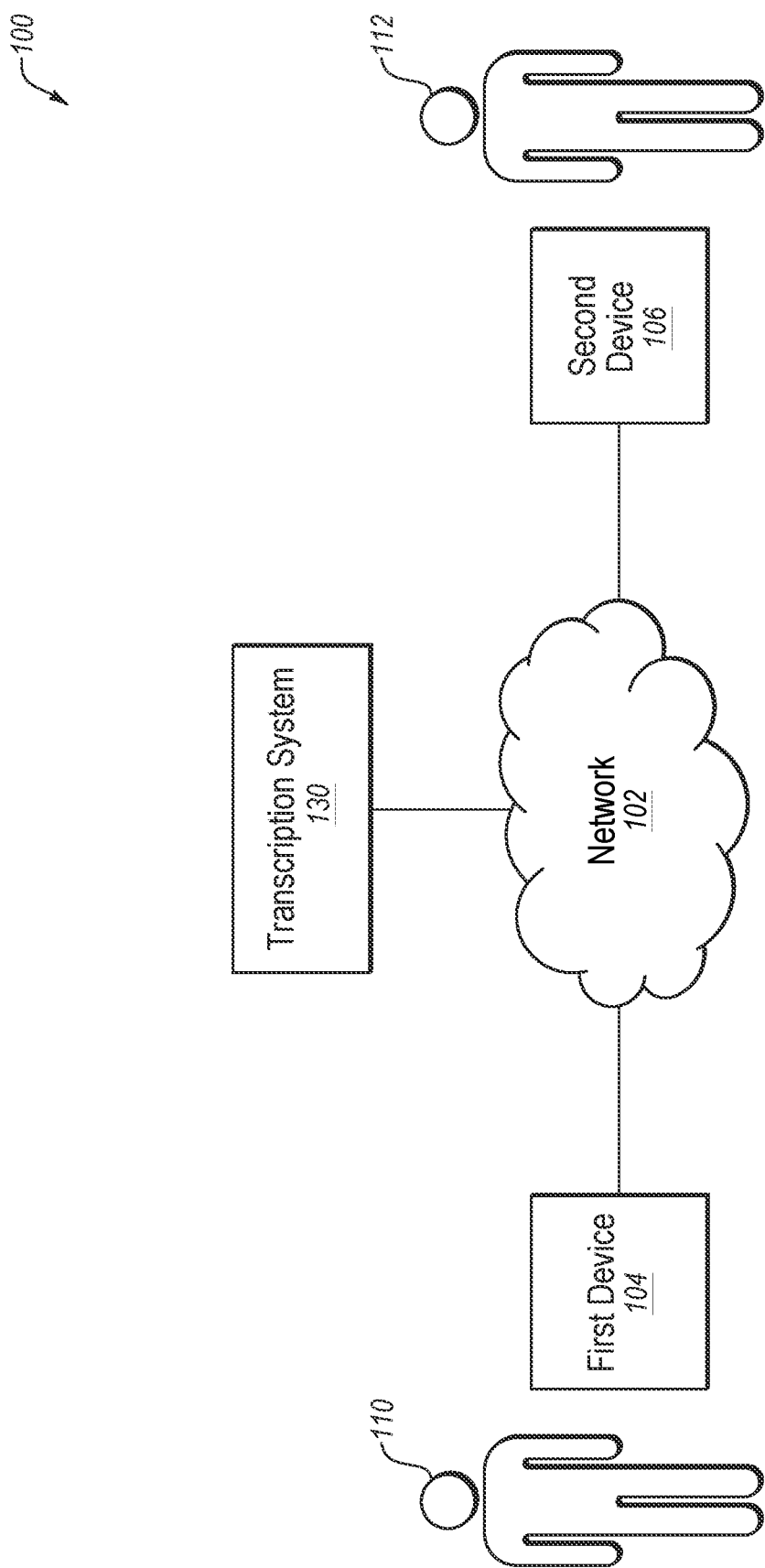
FIG. 1 illustrates an example environment for transcription presentation.

Turning to the figures, FIG. 1 illustrates an example environment 100 for transcription presentation. The environment 100 may be arranged in accordance with at least one embodiment described in the present disclosure. The environment 100 may include a network 102, a first device 104, a second device 106, and a transcription system 130.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations, including multiple different types of networks, network connections, and protocols to communicatively couple devices and systems in the environment 100. In some embodiments, the network 102 may also be coupled to or may include portions of a telecommunications network, including telephone lines, for sending data in a variety of different communication protocols, such as a plain old telephone system (POTS).

Each of the first device 104 and the second device 106 may include or be any electronic or digital computing device. For example, the first device 104 may include a desktop computer, a laptop computer, a smartphone, a mobile phone, a tablet computer, a telephone, a phone console, a caption device, a captioning telephone, or any other computing device that may be used for communication between a first user 110 of the first device 104 and a second user 112 of the second device 106. The second device 106 may include a desktop computer, a laptop computer, a smartphone, a mobile phone, a tablet computer, a telephone, a phone console, a caption device, a captioning telephone, or any other computing device that may be used for communication between the first user 110 of the first device 104 and the second user 112 of second device 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first device 104 and the second device 106 may be configured to establish communication sessions with other devices. For example, each of the first device 104 and the second device 106 may be configured to establish an outgoing communication session, such as a telephone call, voice over internet protocol (VOIP) call, video call, or conference call, among other types of outgoing communication sessions, with another device over a telephone line or network.

In some embodiments, each of the first device 104 and the second device 106 may be configured to obtain audio during a communication session. The audio may be part of an audio communication session, such as a telephone call, VOIP call, or conference call, among other audio communication sessions. As used in this disclosure, the term audio or audio signal may be used generically to refer to sounds that may include spoken words. Furthermore, the term "audio" or "audio signal" may be used generically to include audio in any format, such as a digital format, an analog format, or a propagating wave format.

As an example of obtaining audio, the first device 104 may be configured to obtain first audio from the first user 110. For example, the first device 104 may obtain the first audio from a microphone of the first device 104 or from another device that is communicatively coupled to the first device 104.

The second device 106 may also be configured to obtain second audio from a second user 112. In some embodiments, the second device 106 may obtain the second audio from a microphone of the second device 106 or from another device communicatively coupled to the second device 106. During the communication session, the first device 104 may provide the first audio to the second device 106. Alternatively or additionally, the second device 106 may provide the second audio to the first device 104. One or both of the first device 104 and the second device 106 may be configured to provide obtained audio to the transcription system 130.

In some embodiments, the transcription system 130 may be configured to generate a transcription of the audio received from either one or both of the first device 104 and the second device 106. The transcription system 130 may also provide the generated transcription of the audio to either one or both of the first device 104 and the second device 106. Either one or both of the first device 104 and the second device 106 may be configured to present the transcription received from the transcription system 130. For example, the first device 104 may be configured to display the received transcriptions on a display that is part of the first device 104 or that is communicatively coupled to the first device 104. With respect to FIG. 1, the disclosure may discuss obtaining information and presenting transcriptions to the first device 104 and/or the first user 110 for easy in explanation. However, any description of obtaining information and presenting transcriptions may apply to both the first device 104 and the second device 106 unless otherwise specified.

In some embodiments, the transcription system 130 may include any configuration of hardware, such as processors, servers, and database servers that are networked together and configured to perform a task. For example, the transcription system 130 may include one or multiple computing systems, such as multiple servers that each include memory and at least one processor.

In these and other embodiments, the transcription system 130 may be configured to generate a transcription of audio. For example, the transcription system 130 may be configured to generate a transcription of audio using automatic speech recognition (ASR). In some embodiments, the transcription system 130 may use fully machine-based ASR systems that may operate without human intervention. Alternately or additionally, the transcription system 130 may be configured to generate a transcription of audio using a revoicing transcription system. The revoicing transcription system may receive and broadcast audio to a human agent. The human agent may listen to the broadcast and speak the words from the broadcast. The words spoken by the human agent are captured to generate revoiced audio. The revoiced audio may be used by a speech recognition program to generate the transcription of the audio.

In some embodiments, the transcription may be provided to the first device 104, the second device 106, or both the first device 104 and the second device 106 in real-time or substantially real-time. For example, the audio may be broadcast by the first device 104 and within a limited time frame, such as 0.5, 1, 3, 5, 10, or 15 seconds, a transcription of the speech of the audio may be presented by the first device 104. Thus, the transcription may not be provided all at once. Rather, the transcription may be presented on a rolling basis based on the speech in the audio broadcast by the first device 104, such as closed captioning provided on television in the United States.

In some embodiments, the transcription provided by the transcription system 130 may include incorrect characters or words, among other mistakes that may occur during the transcription generation process. The transcription system 130 may generate revisions of these characters or words, among other mistakes. For example, the transcription system 130 may use an ASR system to generate the transcriptions. The ASR system may generate a first hypothesis of speech in the audio obtained by the transcription system 130. The first hypothesis may include an incorrect word. For example, the first hypothesis may include the word "new" instead of "knew." In these and other embodiments, the transcription system 130 may send the first hypothesis to the first device 104 for presentation. When generating a second hypothesis of the speech, the ASR system may determine that the word is "knew" instead of "new." The transcription system 130 may provide the word "knew" to replace the word "new" in the transcription presented by the first device 104 and thereby revise the transcription presented by the first device 104. Thus, the word "knew" may be a revision to the transcription presented by the first device 104.

In some embodiments, the transcription system 130 may provide revisions to transcriptions for presentation. For example, the transcription system 130 may send a transcription to the first device 104 and after may send one or more revisions of the transcription to the first device 104 for presentation. In these and other embodiments, a revision may be presented on the first device 104 in response to an indication of a change to a presentation on a display of the first device 104. Thus, a revision may not be presented as soon as the revision is available to present. Rather, the first device 104 may present the revision on the display in response to an indication of a change to a presentation on the display of the first device 104 being obtained. By presenting a revision in response to an indication of a change to a presentation on the display, disruption to a user of the display caused by presenting the revision may be reduced.

For example, the first device 104 may obtain audio of a communication session from a second device 106. The first device 104 may provide the audio to the transcription system 130. The transcription system 130 may generate a first transcription of a first portion of the audio and provide the first transcription to the first device 104. The first device 104 may present the first transcription on the display of the first device 104. The transcription system 130 may generate a revision to the first transcription. The transcription system 130 may provide the revision to the first device 104. The first device 104 may not present the revision in response to receiving the revision. In these and other embodiments, the first device 104 may wait for an indication of a change to a presentation on the display to present the revision. In response to the indication of a change to the presentation on the display, the first device 104 may present the revision.

In some embodiments, an indication of a change to a presentation on a display may be obtained based on the first device 104 obtaining data that may cause a change to the presentation on the display. In some embodiments, the data may cause a change to the presentation on the display that may result in the eyes of an average person viewing the display to shift a viewing location on the display.

For example, the first device 104 may obtain data for adjusting characteristics of text presented on the display. The data may by input from the first user 110 for adjusting a font size of or formatting of presented text. Alternately or additionally, the data may by input from the first user 110 regarding adjusting a size of an area in which the transcription is presented that may shift a location of text presented on the display.

As another example, the data obtained by the first device 104 may be additional text of a transcription provided by the transcription system 130. In these and other embodiments, any additional text of the transcription may result in an indication of a change to the presentation. Alternately or additionally, any additional text of the transcription that may result in a new line of text or a new paragraph of text may result in an indication of a change to the presentation. Alternately or additionally, any additional text of the transcription that may result in a shifting of the text presented, such as the scrolling of the text may be an indication of a change to the presentation. Alternately or additionally, certain types of text of the transcription may result in an indication of a change to the presentation. For example, text of the transcription that describe sounds from the audio that are not words, such as ringing, singing, barking, or coughing, may result in an indication of a change to the presentation.

As another example, text of the transcription that includes a number of characters that satisfy a threshold may result in an indication of a change to the presentation. In these and other embodiments, the threshold may be based on a number of characters on a line, a paragraph, or a page of the presentation. In these and other embodiments, the threshold may be based on a number of characters left on a line or paragraph to cause a change in the location of the presentation of characters. For example, if a line of text may hold ten more characters before creation of another line of text, the threshold may set at ten. Thus, if a word that includes eight characters is to be presented, the presentation of the word may not result in an indication of a change to the presentation. In contrast, if a word that include eleven characters is to be presented, the presentation of the word may result in the word be presented on a new line and thus result in an indication of a change to the presentation. In these and other embodiments, the threshold may be dynamic and changing as a transcription is being presented. For example, each presentation of a new word of a transcription may adjust the threshold.

As another example, the data may be data unrelated to the transcription. For example, the data may include visual elements surrounding a transcription. For example, a change or addition of an advertisement or other visual element on a boarder of an interface that is presenting the transcription may result in an indication of a change to the presentation. As another example, a change to an arrangement of visual elements or selection of visual elements may result in an indication of a change to the presentation. For example, a change of an image of a person highlighted or arrangement of images of people during a conference call may result in an indication of a change to the presentation.

In some embodiments, whether a change results in an indication of a change to a presentation on a display may be based on the revision. For example, whether a change results in an indication of a change to a presentation on a display may be based on whether a revision is adding characters, removing characters, and/or changing characters. For example, any type of change to the presentation may result in an indication of a change to the presentation when the revision changes characters presented. Alternately or additionally, a change to the presentation that satisfies a change threshold may result in an indication of a change to the presentation when the revision adds and/or removes characters.

As another example, whether a change results in an indication of a change to a presentation on a display may be based on a location in the transcription of the revision. For example, for a revision to a non-current paragraph, that is a paragraph that is not growing based on newly provided words of the transcription, any type of change to the presentation may result in an indication of a change to the presentation. Alternately or additionally, a change to the presentation that satisfies a change threshold may result in an indication of a change to the presentation when the revision adds or removes characters of a current paragraph.

As another example, whether a change results in an indication of a change to a presentation on a display may be based on a number of characters of the revision. For example, any type of change to the presentation may result in an indication of a change to the presentation when a number of characters of the revision does not satisfy a character change threshold. Alternately or additionally, a change to the presentation that satisfies a change threshold may result in an indication of a change to the presentation when a number of characters of the revision satisfies the character change threshold.

As another example, whether a change results in an indication of a change to a presentation on a display may be based on whether a revision is adding characters, removing characters, and/or changing characters and on a number of characters of the revision. As another example, whether a change results in an indication of a change to a presentation on a display may be based whether a revision is adding characters, removing characters, and/or changing characters, on a number of characters of the revision, and/or a location of the revision.

In some embodiments, a revision may be presented in response to an indication of a change to a presentation on a display until a time threshold is satisfied. For example, a revision may be held and not presented until an indication of a change to a presentation on a display for a particular time period. After expiration of the time period, the revision may be presented regardless of an indication of a change to a presentation on a display. The time threshold may be based on a user preference, a user hearing ability, a user cognitive ability, and/or a topic of the transcription, among other factors.

In some embodiments, in response to an indication of a change to a presentation on a display, a revision may be presented with the change to the presentation. For example, a first revision may be determined and held pending an indication of a change to a presentation. An indication of a change to the presentation may be obtained. In response to the change to the presentation provided in the indication being made, the revision to the presentation may also be made. For example, during a display refresh or redrawing when the change to the presentation in the indication is made, the revision to the presentation may also be made. Thus, the revision and the change are made during the same refresh or redrawing of a display. Alternately or additionally, during a display refresh or redrawing when the change to the presentation in the indication is made, the revision to the presentation may be made within a threshold number of redrawings or refreshes of the display. The threshold number may be based on the refresh or redrawing rate of the display, user preference, a user hearing ability, and/or a user cognitive ability, among other factors. In these and other embodiments, by making the revision and the change during the same or similar redrawing or refresh of the display, any disruption caused by presenting the revision may be reduced.

In some embodiments, as noted above a revision may be obtained but not presented until an indication of a change to a presentation on a display. The revision may be associated with a first portion of the transcription, such as a word, phrase, or character of the transcription, among other portions of the transcription. During the period after the revision is obtained a second revision related to the first portion of the transcription may be obtained. For example, the transcription may include a word "bob," the revision may change the word to "rob," and the second revision may change the word to "Rob." Thus, multiple revisions for the same portion of a transcription, such as a word, phrase, or character of the transcription, may be obtained before the revisions are presented.

In some embodiments, in response to multiple revisions for a portion of a transcription being received before the multiple revisions are presented, one of the multiple revisions may be presented and the remaining revisions may be discarded. In these and other embodiments, a last of the multiple revision obtained may be presented. Alternately or additionally, another of the revisions may be presented.

In some embodiments, the first device 104 may be configured to obtain a revision and to determine when to present the revision. In these and other embodiments, the transcription system 130 may be configured to provide a revision to the first device 104 after the revision is determined without consideration of a change to a presentation of the display of the first device 104. In these and other embodiments, the first device 104 may obtain an indication of a change to a presentation of the display based on one or more of the factors discussed in this disclosure. In response to the indication of the change to the presentation of the display, the first device 104 may present the revision.

In some embodiments, the transcription system 130 may generate a revision and may hold the revision at the transcription system 130. In these and other embodiments, the first device 104 may be configured to provide an indication of a change to a presentation of the display to the transcription system 130. For example, the first device 104 may provide an indication to the transcription system 130 of a change to the presentation based on data obtained by the first device 104. For example, the first device 104 may obtain input from the first user 110 regarding a change to the presentation on the display of the first device 104. Alternately or additionally, the transcription system 130 may obtain an indication of a change to the presentation of the display of the first device 104 based on additional portions of the transcription being generated by the transcription system 130 and being directed to the first device 104. In these and other embodiments, in response to the indication, the transcription system 130 may provide the revision to the first device 104 for presentation by the first device 104.

Modifications, additions, or omissions may be made to the environment 100 without departing from the scope of the present disclosure. For example, in some embodiments, the environment 100 may include additional devices. In these and other embodiments, the additional devices may be configured to present transcriptions, present revisions, obtain user input, present audio, and/or capture audio, among other functions described with respect to the first device 104 and/or the second device 106. For example, the environment 100 may include multiple other devices in communication therebetween such that the communication session is a conference call. In these and other embodiments, a transcription of audio from all or some of the devices may be generated.

In some embodiments, the environment 100 may not include the transcription system 130. In these and other embodiments, the first device 104 and/or the second device 106 may include the transcription system 130. For example, the second device 106 may include the transcription system 130 and may provide transcriptions of the audio captured by the second device 106 to the first device 104.

In some embodiments, the environment 100 may not include the second device 106. In these and other embodiments, the environment 100 may include another system that may be configured to provide audio to the first device 104. In these and other embodiments, the first device 104 may not provide audio to the system. For example, the system may be a recording system that is streaming audio and/or video to the first device 104. In these and other embodiments, the audio may be streamed to the first device 104 and routed to the transcription system 130. Alternately or additionally, the system may provide the audio to the transcription system 130 and to the first device 104.

In some embodiments, the functionality performed by the first device 104 may be performed by multiple devices. For example, a communication device may handle communication protocols with the second device 106 for a communication session and provide audio to and receive audio from a user device during the communication session. In these and other embodiments, the user device may communicate with the transcription system 130 and present audio and transcriptions to a user. In some embodiments, the communication device and the user device may be wired or wireless coupled, such as by a wireless network. In these and other embodiments, the wireless network may be a short-range network, such as a Bluetooth® network. Alternately or additionally, the functionality of the first device 104 may be performed by three devices, a communication device, an audio presentation device, and a display device. In these and other embodiments, the communication device may handle communication protocols with the second device 106, the audio presentation device may present audio of the communication session, and the display device may correspond with the transcription system 130 and present transcriptions of the communication session. Other configurations of device may also be used to perform the functionality of the first device 104.

FIGS. 2a, 2b, and 2c illustrate an example of transcription presentation as discussed in this disclosure. For example, FIG. 2a illustrates example audio 210 accordingly to some embodiments in the disclosure. The audio 210 may be an example of audio that may be provided by a first device, such as the first device 104 of FIG. 1 and received by a transcription system, such as the transcription system 130 of FIG. 1. The audio 210 may be represented as divided into segments, including a first segment 210a, a second segment 210b, a third segment 210c, and a fourth segment 210d for ease of explanation. The segmentation of the audio 210 may or may not occur in the system and methods described in this disclosure. For example, the audio 210 may be a continuous stream that is part of a communication session.

The segments of the audio 210 may include different words in audible form. For example, the first segment 210a may include the word "this." The second segment 210b may include the words "is a." The third segment 210c may include the word "new" and the fourth segment 210d may include the word "cat." The segments may be received in an order from left to right as illustrated in FIG. 2a. In response to receiving the audio 210, a transcription system or other device may provide the audio 210 to a speech recognition system. The audio 210 may be provided as the audio is received such that the speech recognition system receives the first segment 210a before the other segments of the audio. In response to receiving the audio 210, the speech recognition system may generate hypothesis transcriptions of the audio 210.

FIG. 2b illustrates example transcriptions of the audio 210 of FIG. 2a, according to some embodiments of the disclosure. In particular, FIG. 2b illustrates a first hypothesis transcription 220a, a second hypothesis transcription 220b, a third hypothesis transcription 220c, a fourth hypothesis transcription 220d, and a fifth hypothesis transcription 220e, referred to as the hypothesis transcriptions 220. The first hypothesis transcription 220a may represent a hypothesis transcription of the first segment 210a and the second segment 210b. The second hypothesis transcription 220b may represent a hypothesis transcription of the first segment 210a, the second segment 210b, and the third segment 210c. The third hypothesis transcription 220c may represent a hypothesis transcription of the first segment 210a, the second segment 210b, and the third segment 210c. The third hypothesis transcription 220c may include a revision with respect to the second hypothesis transcription 220b. For example, the third hypothesis transcription 220c may include the word "a." The fourth hypothesis transcription 220d may represent a hypothesis transcription of the first segment 210a, the second segment 210b, the third segment 210c, and the fourth segment 210d. The fifth hypothesis transcription 220e may represent a hypothesis transcription of the first segment 210a, the second segment 210b, the third segment 210c, and the fourth segment 210d. The fifth hypothesis transcription 220e may include a revision with respect to the second hypothesis transcription 220b, third hypothesis transcription 220c, and the fourth hypothesis transcription 220d. For example, the fifth hypothesis transcription 220e may change the word "blue" to "new."

The first hypothesis transcription 220a may be generated by a speech recognition system after the speech recognition system receives the first segment 210a and the second segment 210b. In some embodiments, the first hypothesis transcription 220a may be generated by the speech recognition system before receiving all of the audio 210. As illustrated, the first hypothesis transcription 220a may not be an accurate transcription of the second segment 210b.

The second hypothesis transcription 220b may be generated by the speech recognition system after the speech recognition system receives the third segment 210c. In some embodiments, the second hypothesis transcription 220b may be generated by the speech recognition system before receiving all of the audio 210. As illustrated, the second hypothesis transcription 220b may not be an accurate transcription of the second segment 210b and the third segment 210c.

The third hypothesis transcription 220c may be generated by the speech recognition system after the speech recognition system receives the third segment 210c. In some embodiments, the third hypothesis transcription 220c may be generated by the speech recognition system before receiving all of the audio 210. As illustrated, the third hypothesis transcription 220c may correct an error in the second hypothesis transcription 220b. As such, the third hypothesis transcription 220c may include a revision to the second hypothesis transcription 220b.

The fourth hypothesis transcription 220d may be generated by the speech recognition system after the speech recognition system receives the fourth segment 210d. In some embodiments, the fourth hypothesis transcription 220d may be generated by the speech recognition system before receiving all of the audio 210. As illustrated, the fourth hypothesis transcription 220d may not be an accurate transcription of the third segment 210c.

The fifth hypothesis transcription 220e may be generated by the speech recognition system after the speech recognition system receives the fourth segment 210d. As illustrated, fifth hypothesis transcription 220e may correct an error in the second hypothesis transcription 220b, the third hypothesis transcription 220c, and the fourth hypothesis transcription 220d. As such, the fifth hypothesis transcription 220e may include a revision to the second hypothesis transcription 220b, the third hypothesis transcription 220c, and the fourth hypothesis transcription 220d.

FIG. 2c illustrates presentations 230 of the transcriptions of the audio 210 of FIG. 2b, according to some embodiments of the disclosure. The presentations 230 may include a first presentation 230a, a second presentation 230b, a third presentation 230c, and a fourth presentation 230d, referred to collectively as the presentations 230. The presentations 230 may illustrate how a device, such as one of the first device 101 or the second device 106 of FIG. 1, may present a transcription and revisions to a transcription.

In some embodiments, the first presentation 230a may present the words from the first hypothesis transcription 220a. The second presentation 230b may occur after the first presentation 230a. In some embodiments, the second presentation 230b may present the words from the second hypothesis transcription 220b. In these and other embodiments, the second presentation 230b may add new words of the second hypothesis transcription 220b that follow a last word of the first hypothesis transcription 220a. For example, the second presentation 230b may add the word "blue" to the presentation because the words "This a" were previously presented. The third hypothesis transcription 220c may include a revision to the second hypothesis transcription 220b and may not include additional words. As such, the revision of the third hypothesis transcription 220c may not be presented until a change is made to the second presentation 230b.

In some embodiments, the third presentation 230c may occur after the second presentation 230b. The third presentation 230c may present the words from the fourth hypothesis transcription 220d. In these and other embodiments, the third presentation 230c may add new words of the fourth hypothesis transcription 220d that follow a last word of the second hypothesis transcription 220b and the third hypothesis transcription 220c. In these and other embodiments, the third presentation 230c may also present the revision of the third hypothesis transcription 220c to include the word "is." The revision may be presented based on the change to the second presentation 230b by the addition of the word "cat."

In some embodiments, the fourth presentation 230d may occur after the third presentation 230c. The fourth presentation 230d may present the revision from the fifth hypothesis transcription 220e. In these and other embodiments, the fourth presentation 230d may change the word "blue" to the word "new." The revision may be presented based on a change to the third presentation 230c, such as a change of the size of the fourth presentation 230d as compared to the size of the third presentation 230c. Modifications, additions, or omissions may be made to the example method illustrated in FIGS. 2a, 2b, and 2c, without departing from the scope of the present disclosure.

Figure 3:
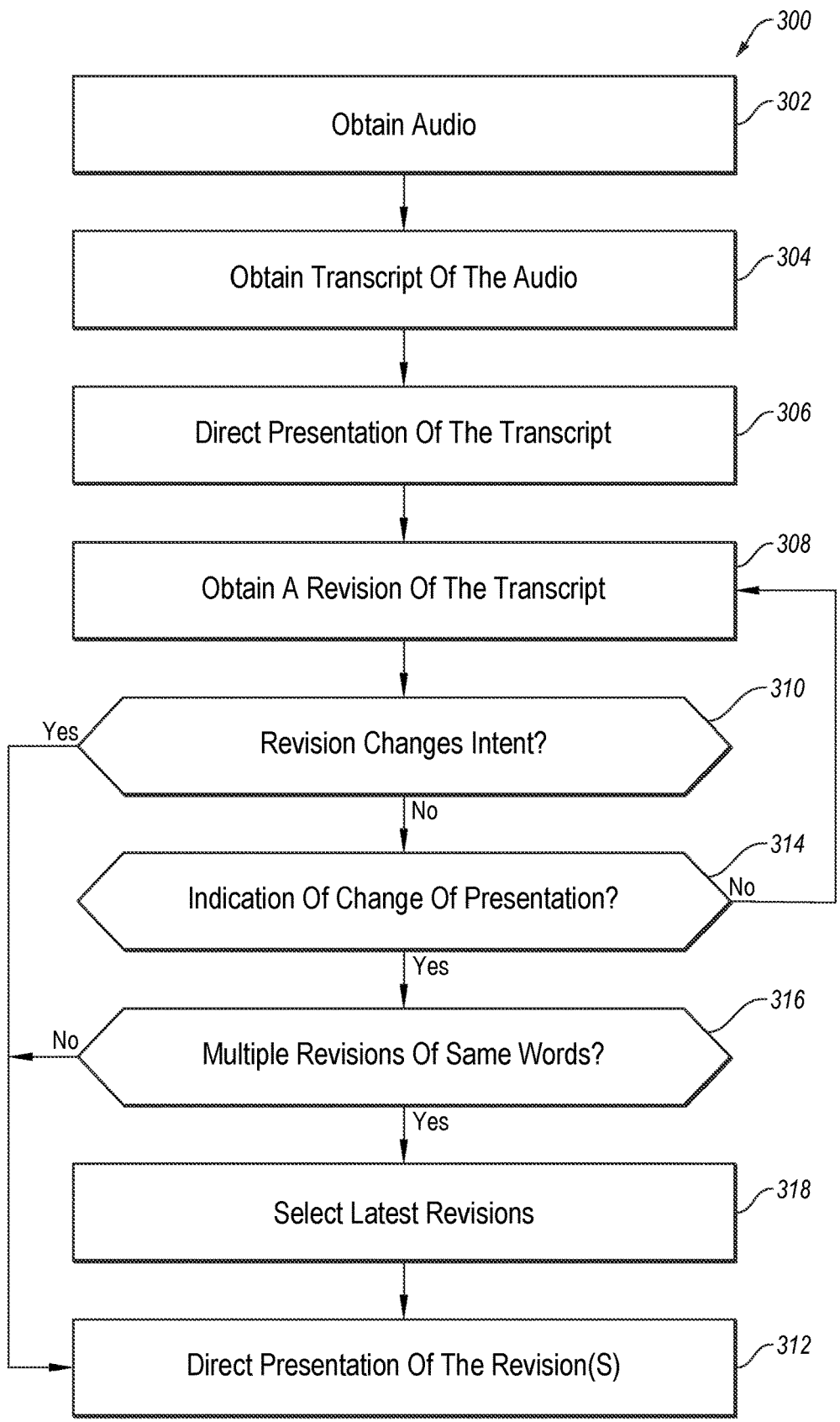
FIG. 3 illustrate a flowchart of an example method to present transcriptions.

FIG. 3 illustrate a flowchart of an example method 300 to present transcriptions. The method 300 may be arranged in accordance with at least one embodiment described in the present disclosure. One or more operations of the method 300 may be performed, in some embodiments, by a device or system, such as the first device 104 of FIG. 1 or another device or combination of devices. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where audio may be obtained. The audio may be audio of communication between two or more devices, such as the first device 104 and the second device 106 of FIG. 1. Alternately or additionally, the audio may be from another source, such as audio from a presentation, movie, court room, medical office, or television production, among other source.

At block 304, a transcript of the audio may be obtained. The transcript may include multiple words of the audio. The transcript may be obtained from a transcription system. In some embodiments, the transcription system may be part of the device configured to present the transcription to a user. Alternately or additionally, the transcription system may be remote to the device configured to present the transcription to a user.

At block 306, presentation of the transcript may be directed. For example, a device for presenting the transcript, such as the first device 104 of FIG. 1, may direct presentation of the transcript on a display of the device or on a display of another device. The device may cause the words of the transcript to be presented on a display of the device. The presentation of the transcript may occur in a rolling fashion such that words may be displayed over a period of time as the words are observed in the audio and transcribed.

At block 308, a revision of the transcript may be obtained. In some embodiments, the revision may be associated with one or more of the words of the transcript. In these and other embodiments, the revision may include adding a new word/character to the transcript, removing a word/character from the transcript, or changing a word/character in the transcript. In some embodiments, the revision may be associated with a word for which a previous revision is obtained. As such, for any word and/or character multiple revisions may be obtained before one or more of the revisions are applied to the transcript.

At block 310, it may be determined if the revision changes the intent of the transcript. In response to the revision changing the intent, the method 300 may proceed to block 312. In response to the revision not changing the intent of the transcript, the method 300 may proceed to block 314.

In these and other embodiments, the intent of the transcript may refer to an intended meaning of the words of the transcript. For example, the transcript may state "I will go to the store." The revision may be the inclusion of the word "not" between the words "will" and "go." Thus, the revision changes the intent of the transcript by changing the meaning/context of the transcript. A revision changing the intent of the transcript may thus refer to the revision changing the intent of a sentence, phrase, and/or paragraph of the transcript without changing the intent of other portions of the transcript. Other revisions may not change the intent of a transcript. In these and other embodiments, the revisions that may not change the intent of a transcript may provide clarification or additional context to the sentence without changing the intent of the transcript.

In some embodiments, whether a revision changes an intent of a transcript may be determined using a machine learning model. In these and other embodiments, the transcript and the revision may be provided to the machine learning model. The machine learning model may be trained using revisions and transcripts with an indication whether the revision changes the intent. As such, the machine learning model may be able to identify revisions that may change the intent of a transcript. In these and other embodiments, the machine learning model may output a probability that the revision changes the intent of the transcript. In response to the probability satisfying a threshold, it may be determined that the intent of the transcript is changed based on the revision.

At block 312, presentation of one or more revision may be directed. In some embodiments, multiple revisions may have been obtained without being presented. Some of the multiple revisions may be directed to the same word/character. Other of the multiple revisions may each be directed to different words/characters of the transcript. In these and other embodiments, when multiple revisions that are each directed to different words/characters of the transcript that have not been presented, the multiple revisions may be presented during one refresh of the presentation.

In some embodiments, the presentation of one or more revisions may be directed in response to an indication of a change of a presentation of a display. In these and other embodiments, the presentation of the one or more revisions may be presented concurrently with a change of the presentation, such as during a redrawing or refresh of the display that makes the change. Alternately or additionally, if the revision changes the intent of the transcript, the revision may be presented without a change in a presentation of a display. In these and other embodiments, if there are multiple other revisions that are not associated with the word and/or character of the revision that changes the intent of the transcript, the multiple other revisions may also be presented.

At block 314, it may be determined if an indication of a change of presentation has been obtained. In response to an indication of a change of presentation being obtained, the method 300 may proceed to block 316. In response to an indication of a change of presentation not being obtained, the method 300 may proceed to block 308. In block 308, additional revisions may be obtained. In these and other embodiments, the additional revisions may apply to the same word/character or to different word/characters.

At block 316, it may be determined if there are multiple revisions of the same word/character of the transcript. In response to there being multiple revisions of the same word/character, the method 300 may proceed to block 318. In response to there not being multiple revisions of the same word/character, the method 300 may proceed to block 312.

At block 318, the latest revision of the word/character may be selected for presentation. In these and other embodiments, the selected revision may be presented in block 312.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 300 may not include the block 310. Alternately or additionally, the method 300 may not include the block 316 and 318.

As another example, the method 300 may include additional blocks. For example, the method 300 may include additional blocks that analyze a change of a presentation to determine if an indication of a change of the presentation that results in presentation of one or more revisions is to be made based on the change to the presentation. For example, a change to the characters presented on the display that does not satisfy a character change threshold may not result in an indication of a change to the presentation. In contrast, a change to the characters presented on the display that does satisfy a character change threshold may not result in an indication of a change to the presentation. In these and other embodiments, a character change threshold may be based on the type of change or a number of characters changed, among other metrics described in this disclosure. As an example, the character change threshold may be a number of characters. In these and other embodiments, the number of characters to change, such as a number of characters to be presented of the transcription, may be compared to the character change threshold to determine if the change results in an indication of a change to the presentation.

Figure 4:
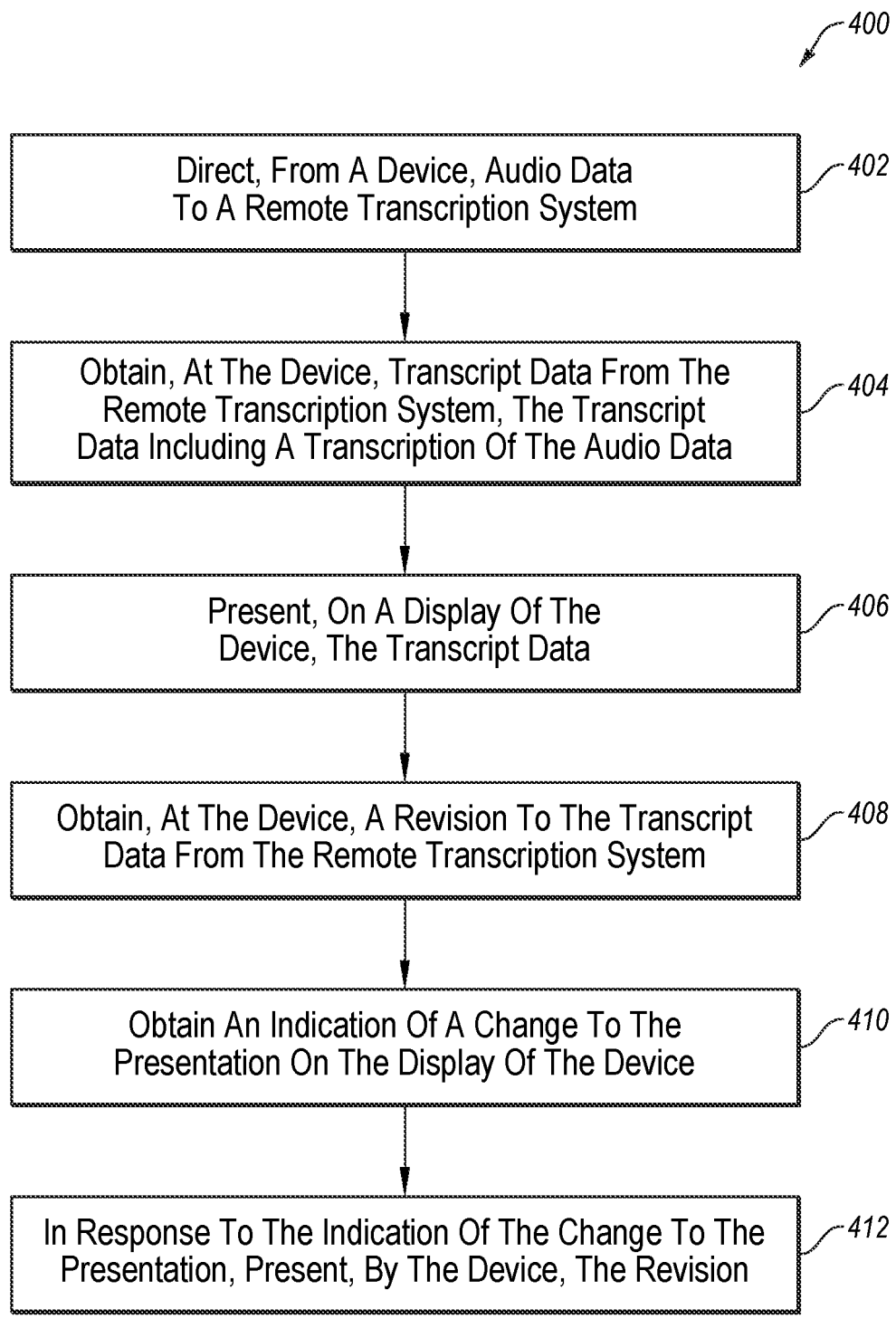
FIG. 4 illustrate a flowchart of another example method to present transcriptions.

FIG. 4 illustrates a flowchart of an example method 400 to present transcriptions. The method 400 may be arranged in accordance with at least one embodiment described in the present disclosure. One or more operations of the method 400 may be performed, in some embodiments, by a device or system, such as the first device 104 of FIG. 1 or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where audio data may be directed from a device to a remote transcription system.

At block 404, transcript data may be obtained at the device from the remote transcription system. In these and other embodiments, the transcript data may include a transcription of the audio data.

At block 406, the transcript data may be presented on a display of the device. At block 408, a revision to the transcript data may be obtained obtaining at the device from the remote transcription system.

At block 410, an indication of a change to the presentation on the display of the device may be obtained. In some embodiments, obtaining an indication of the change to the presentation by the device may include obtaining: an indication that one or more characters not previously presented of the transcript data are to be presented or an indication that a characteristic of text previously presented is to be adjusted. Alternately or additionally, the indication of the change to the presentation may be obtained based on a change in characters presented by the display satisfying a character change threshold.

At block 412, in response to the indication of the change to the presentation, the revision may be presented by the device. In some embodiments, the revision may be obtained by the device after the indication of the change to the presentation is obtained. Alternately or additionally, the revision may be obtained by the device before the indication of the change to the presentation is determined.

In some embodiments, multiple revisions to the transcript data may be generated before the indication of the change to the presentation and the revision presented by the device may be a last revision generated of the multiple revisions. In these and other embodiments, the multiple revisions may be different revisions for a same word in the transcript data.

In some embodiments, the revision may not be presented until after the indication of the change to the presentation is obtained in response to the revision not changing an intent of the audio data. In these and other embodiments, in response to the revision changing the intent of the audio data, the revision may be presented by the device without consideration of an indication of a change to the presentation.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
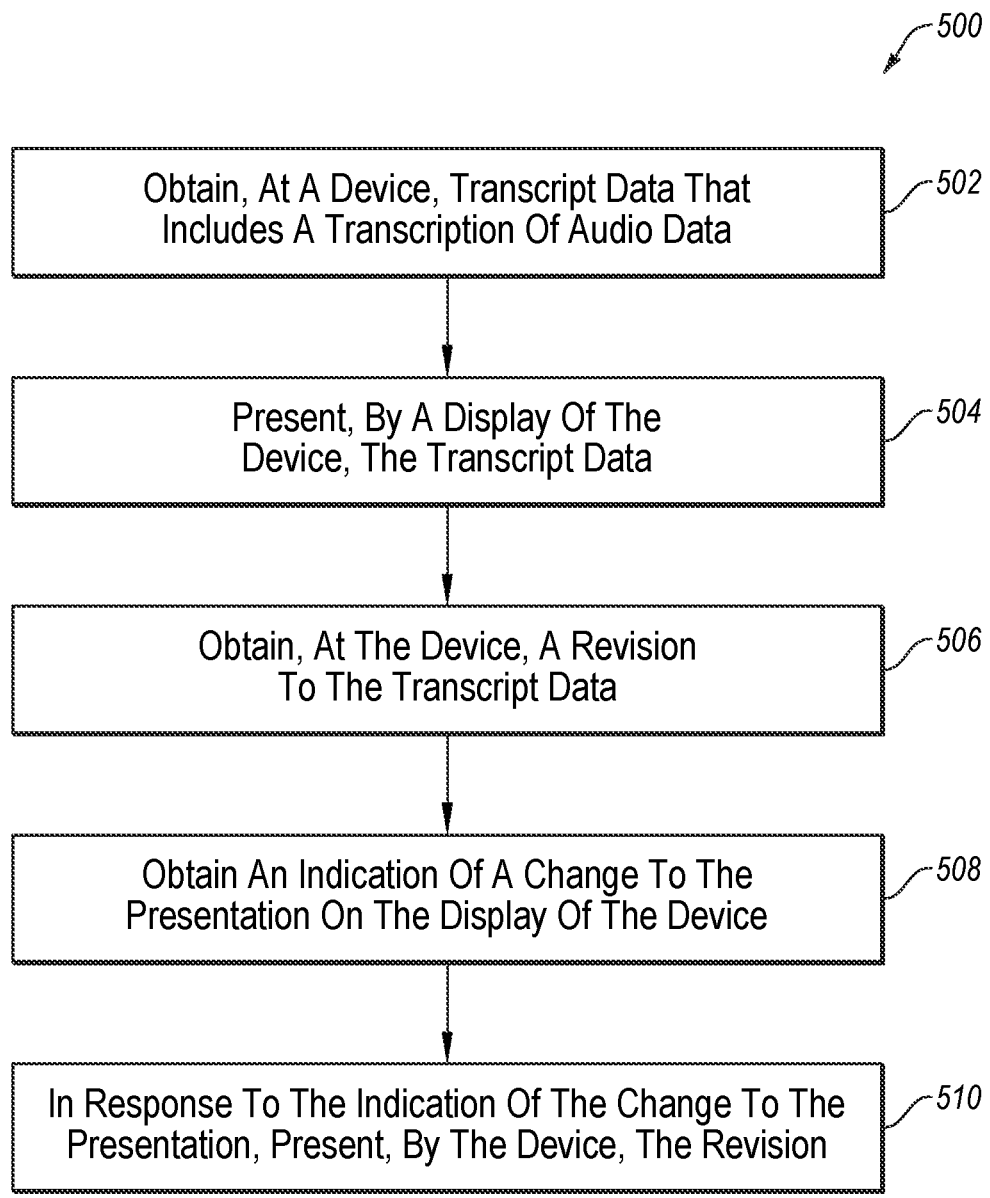
FIG. 5 illustrates a flowchart of another example method to present transcriptions.

FIG. 5 illustrates a flowchart of an example method 500 to present transcriptions. The method 500 may be arranged in accordance with at least one embodiment described in the present disclosure. One or more operations of the method 500 may be performed, in some embodiments, by a device or system, such as the first device 104 of FIG. 1 or another device or combination of devices. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where transcript data that includes a transcription of audio data may be obtained at a device.

At block 504, the transcript data may be presented by a display of the device. At block 506, a revision to the transcript data may be obtained at the device.

At block 508, an indication of a change to the presentation on the display of the device may be obtained. In some embodiments, obtaining an indication of the change to the presentation by the device may include obtaining: an indication that one or more characters not previously presented of the transcript data are to be presented or an indication that a characteristic of text previously presented is to be adjusted.

At block 510, in response to the indication of the change to the presentation, the revision is presented by the device. In some embodiments, multiple revisions to the transcript data may be generated before the indication of the change to the presentation and the revision presented by the device is a last revision generated of multiple revisions. In these and other embodiments, the multiple revisions may be different revisions for a same word in the transcript data.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
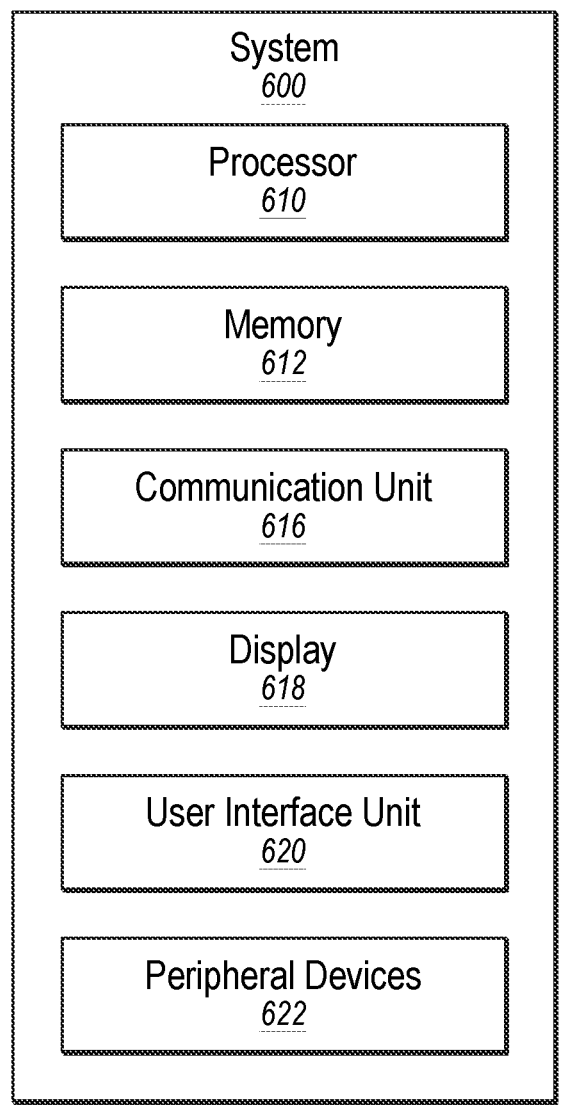
FIG. 6 illustrates an example system that may be used during transcription presentation.

FIG. 6 illustrates an example system 600 that may be used during transcription presentation. The system 600 may be arranged in accordance with at least one embodiment described in the present disclosure. The system 600 may include a processor 610, memory 612, a communication unit 616, a display 618, a user interface unit 620, and a peripheral device 622, which all may be communicatively coupled. In some embodiments, the system 600 may be part of any of the systems or devices described in this disclosure.

For example, the system 600 may be part of the first device 104 of FIG. 1 and may be configured to perform one or more of the tasks described above with respect to the first device 104. As another example, the system 600 may be part of the transcription system 130 of FIG. 1 and may be configured to perform one or more of the tasks described above with respect to the transcription system 130.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to transcription presentation such that the system 600 may perform or direct the performance of the operations associated therewith as directed by the instructions. In these and other embodiments, the instructions may be used to perform one or more operations of the method 300, the method 400, or the method 500 of FIGS. 3, 4, and 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure. For example, when the system 600 is included in the first device 104 of FIG. 1, the communication unit 616 may allow the first device 104 to communicate with the transcription system 130.

The display 618 may be configured as one or more displays, like an LCD, LED, Braille terminal, or other type of display. The display 618 may be configured to present video, text captions, user interfaces, and other data as directed by the processor 610. For example, when the system 600 is included in the first device 104 of FIG. 1, the display 618 may be configured to present a transcription.

The user interface unit 620 may include any device to allow a user to interface with the system 600. For example, the user interface unit 620 may include a mouse, a track pad, a keyboard, buttons, camera, and/or a touchscreen, among other devices. The user interface unit 620 may receive input from a user and provide the input to the processor 610. In some embodiments, the user interface unit 620 and the display 618 may be combined.

The peripheral devices 622 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 600 or otherwise generated by the system 600.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method of transcript presentation, the method comprising:

directing, from a device, audio data to a remote transcription system;

obtaining, at the device, transcript data from the remote transcription system, the transcript data including a transcription of the audio data;

presenting, on a display of the device, the transcript data;

obtaining, at the device, a revision to the transcript data from the remote transcription system;

obtaining an indication of a change to the presentation on the display of the device, the change to the presentation on the display resulting in the indication being unrelated to one or more revisions to the transcript data that include the revision; and in response to obtaining the indication of the change to the presentation, presenting, by the device, the revision.

2. The method of claim 1, wherein the revision is obtained by the device after the indication of the change to the presentation is obtained.

3. The method of claim 1, wherein the revision is obtained by the device before the indication of the change to the presentation is determined.

4. The method of claim 1, wherein the one or more revisions include a plurality of revisions to the transcript data that are generated before the indication of the change to the presentation and the revision presented by the device is a last revision generated of the plurality of revisions.

5. The method of claim 4, wherein the plurality of revisions are different revisions for a same word in the transcript data.

6. The method of claim 1, wherein obtaining the indication of the change to the presentation by the device includes obtaining: an indication that one or more characters not previously presented of the transcript data are to be presented or an indication that a characteristic of text previously presented is to be adjusted.

7. The method of claim 1, wherein the indication of the change to the presentation is obtained based on a change in characters presented by the display satisfying a character change threshold.

8. The method of claim 1, wherein the revision is not presented until after the indication of the change to the presentation is obtained in response to the revision not changing an intent of the audio data, wherein in response to the revision changing the intent of the audio data, the revision is presented by the device without consideration of an indication of a change to the presentation.

9. At least one non-transitory computer-readable media configured to store one or more instructions that, in response to being executed by a system, cause or direct the system to perform the method of claim 1.

10. A system comprising:
one or more computer readable mediums including instructions;
one or more computing systems coupled to the one or more computer readable mediums and configured to execute the instructions to cause or direct the system to perform operations, the operations comprising:
obtaining audio data;
obtaining transcript data, the transcript data including a transcription of the audio data;
directing the transcript data to a device for presentation of the transcript data;
after directing the transcript data to the device, obtaining a revision of the transcript data;
obtaining an indication of a change to a presentation by a display of the device, the change to the presentation on the display resulting in the indication being unrelated to one or more revisions to the transcript data that include the revision; and
in response to obtaining the indication of the change to the presentation, directing the revision to the device for presentation of the revision.

11. The system of claim 10, wherein the obtaining the indication of the change to the presentation includes obtaining: an indication that one or more characters not previously presented of the transcript data are to be presented or an indication that a characteristic of text previously presented is to be adjusted.

12. The system of claim 10, wherein the indication of the change to the presentation is determined based on a change in characters presented by the display satisfying a character change threshold.

13. The system of claim 10, wherein the operations further comprise after directing the transcript data to the device, obtaining a plurality of revisions of the transcript data that include the revision, wherein the revision is a last revision obtained of the plurality of revisions and the one or more revisions include the plurality of revisions to the transcript data.

14. The system of claim 13, wherein the plurality of revisions are different revisions for a same word in the transcript data.

15. The system of claim 10, wherein the revision is not directed to the device until after the indication of the change to the presentation is obtained in response to the revision not changing an intent of the audio data, wherein in response to the revision changing the intent of the audio data, the revision is directed to the device without consideration of an indication of a change to the presentation.

16. A method of transcript presentation, the method comprising:
obtaining, at a device, transcript data that includes a transcription of audio data;
presenting, by a display of the device, the transcript data;
obtaining, at the device, a revision to the transcript data;
obtaining an indication of a change to the presentation on the display of the device, the change to the presentation on the display resulting in the indication being unrelated to one or more revisions to the transcript data that include the revision; and
in response to obtaining the indication of the change to the presentation, presenting, by the device, the revision.

17. The method of claim 16, wherein the one or more revisions include a plurality of revisions to the transcript data that are generated before the indication of the change to the presentation and the revision presented by the device is a last revision generated of the plurality of revisions.

18. The method of claim 17, wherein the plurality of revisions are different revisions for a same word in the transcript data.

19. The method of claim 16, wherein obtaining the indication of the change to the presentation by the device includes obtaining: an indication that one or more characters not previously presented of the transcript data are to be presented or an indication that a characteristic of text previously presented is to be adjusted.

20. At least one non-transitory computer-readable media configured to store one or more instructions that, in response to being executed by a system, cause or direct the system to perform the method of claim 16.

* * * * *